(12) United States Patent  (10) Patent No.: US 8,899,620 B1
Bhardwaj et al.  (45) Date of Patent: Dec. 2, 2014

(54) ROLLOVER PROTECTION STRUCTURE

(71) Applicants: Sahil Bhardwaj, Sudbury (CA); Jack R. Smith, Blezard Valley (CA)

(72) Inventors: Sahil Bhardwaj, Sudbury (CA); Jack R. Smith, Blezard Valley (CA)

(73) Assignees: Sahil Bhardwaj, Ontario (CA); Jack R. Smith, Ontario (CA)

( * ) Notice: Subject to any disclaimer, the term of this patent is extended or adjusted under 35 U.S.C. 154(b) by 0 days.

(21) Appl. No.: 13/907,062

(22) Filed: May 31, 2013

(51) Int. Cl.
*B60R 21/13* (2006.01)
*B62D 65/16* (2006.01)

(52) U.S. Cl.
CPC ............... *B60R 21/13* (2013.01); *B62D 65/16* (2013.01)
USPC ........................................................ 280/756

(58) Field of Classification Search
CPC .......................... B60R 21/13; B60R 2021/137
USPC ....................................................... 280/756
See application file for complete search history.

(56) References Cited

U.S. PATENT DOCUMENTS

| | | | |
|---|---|---|---|
| 3,985,386 A | 10/1976 | Woods | |
| 4,057,281 A * | 11/1977 | Garrett | 296/3 |
| D253,170 S * | 10/1979 | Ramirez | D12/412 |
| 4,171,141 A * | 10/1979 | Hobrecht | 280/756 |
| 4,770,458 A * | 9/1988 | Burke et al. | 296/3 |
| 4,783,097 A * | 11/1988 | Browning et al. | 280/756 |
| 4,854,628 A * | 8/1989 | Halberg | 296/3 |
| D305,111 S * | 12/1989 | Zagner | D12/412 |
| 4,900,058 A * | 2/1990 | Hobrecht | 280/756 |
| 5,000,480 A * | 3/1991 | Straka et al. | 280/756 |
| 5,205,585 A | 4/1993 | Reuber et al. | |
| 5,476,301 A * | 12/1995 | Berkich | 296/3 |
| 5,480,205 A * | 1/1996 | Tayar | 296/3 |
| 5,628,540 A * | 5/1997 | James | 296/3 |
| D444,446 S * | 7/2001 | Carter | D12/406 |
| 6,471,280 B1 | 10/2002 | Fowler | |
| 6,983,968 B2 * | 1/2006 | Brauer et al. | 296/3 |
| 7,607,722 B2 | 10/2009 | Frett et al. | |
| 8,087,694 B2 | 1/2012 | Johnson et al. | |
| 8,366,183 B2 | 2/2013 | Ishigame et al. | |
| 8,414,168 B2 | 4/2013 | Jutila et al. | |
| 2003/0011180 A1 * | 1/2003 | Coffman et al. | 280/748 |

* cited by examiner

*Primary Examiner* — Drew Brown
(74) *Attorney, Agent, or Firm* — Anthony Asquith Corp.

(57) ABSTRACT

The ROPS comprises a highly rigid behind-cab-frame, a mounting-plate of which is bolted to the truck chassis. A roof-canopy is integrated into the frame. The ROPS includes a brace which holds the frame upright, and ensures that the roof-canopy remains in position, protecting the cab, during rollover. The frame is bolted into the chassis using the same bolts that hold the cargo-box to the chassis (or longer bolts), whereby installation is quick and easy. The installed ROPS is held fast to the chassis of the truck with great strength and rigidity, but there is no disruption to the structural integrity of the chassis.

13 Claims, 6 Drawing Sheets

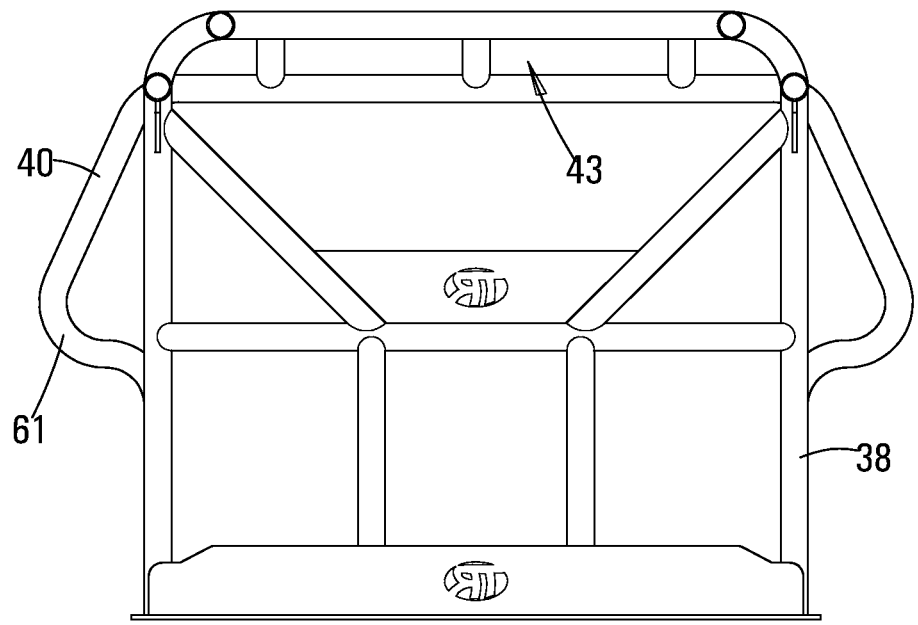
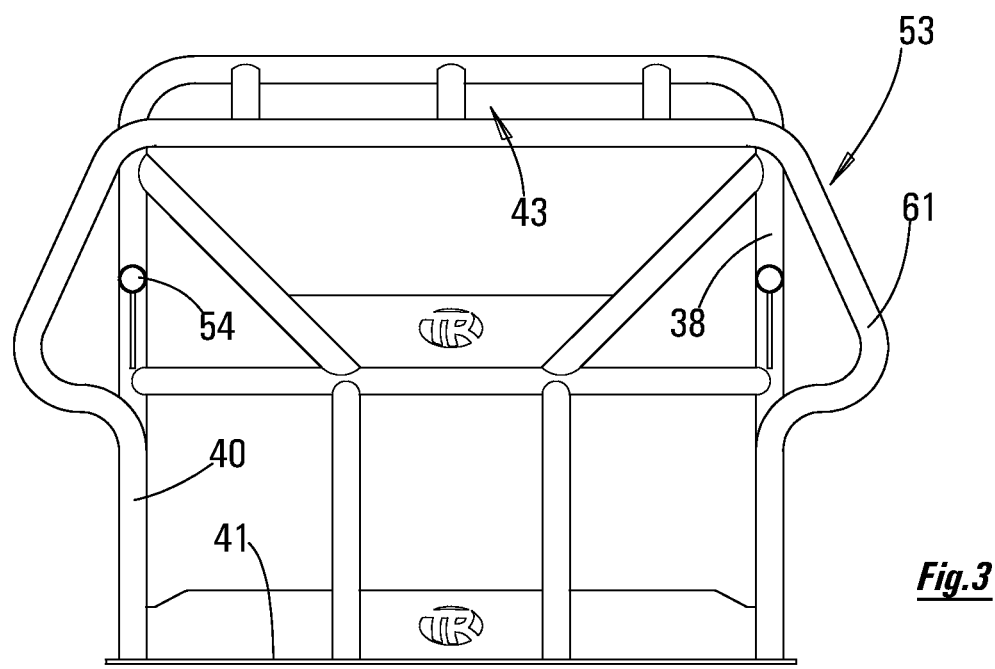

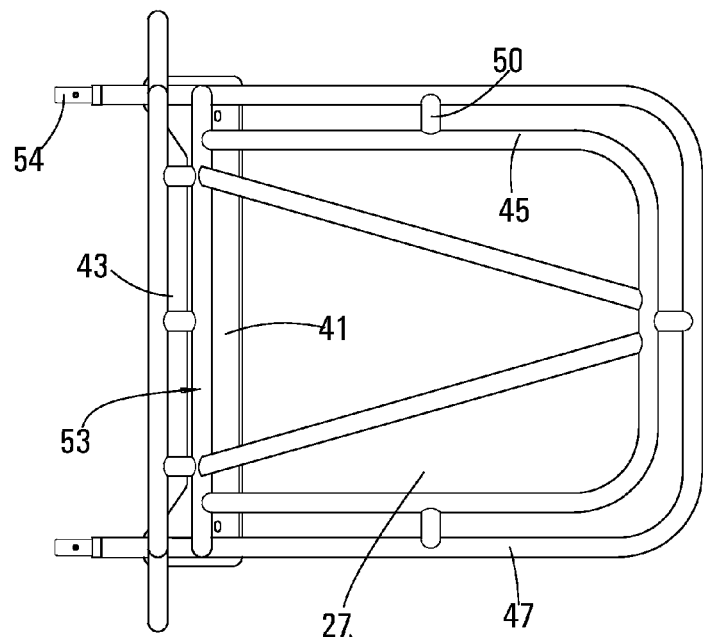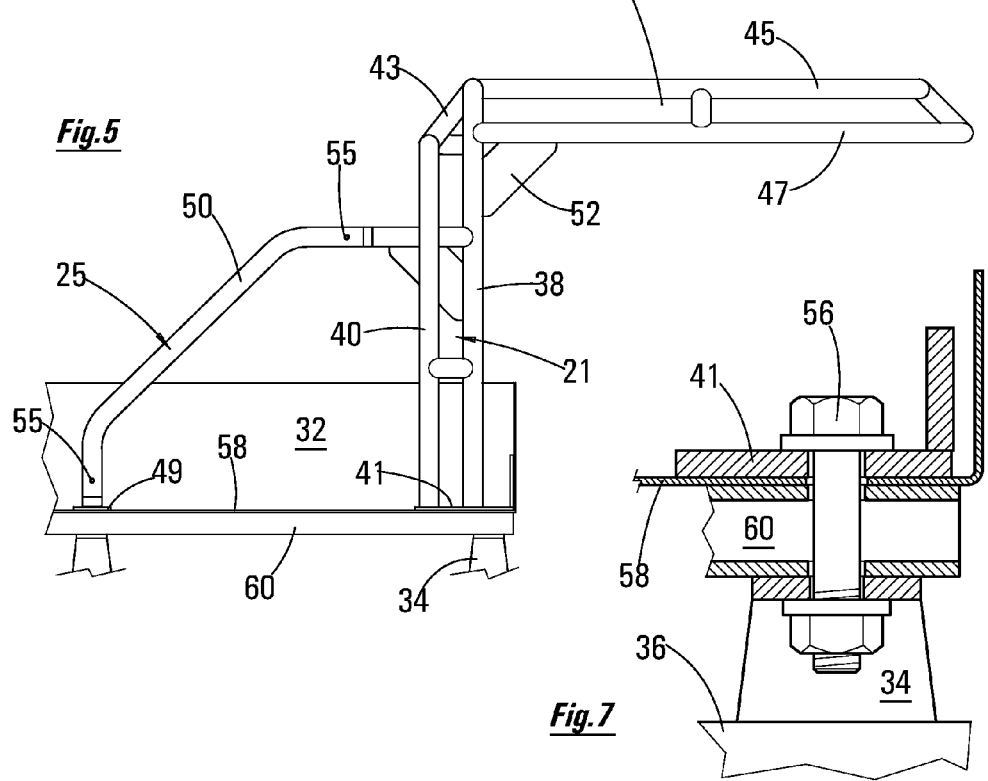

ROLLOVER PROTECTION STRUCTURE

This technology relates to a rollover protection structure (ROPS) for use in pickup trucks and similar light-duty commercial vehicles.

Rollover events occur when vehicle are driven over ordinary roads, but such events occur significantly more frequently when the roads are the roads of open-pit mines, tailing areas, exploration sites, construction sites, and so on, which often do not have a metalled surface. At such sites, the risk of running off the road or track is much greater than on ordinary roads. Rolling over, often at medium or slow speed, down a sloping embankment, is a common type of accident at such sites, and is a common cause of injuries and fatalities. Most of the injuries arise as a result of the cab being flattened or crushed.

Many types of vehicle have been fitted with roll-cages or other ROPSs. In some cases, the ROPS includes a roof-canopy, which is supported from the chassis of the vehicle at a location that is forward of the cab. It might be considered preferable, from the strength and rigidity standpoint, for the roof-canopy to be supported both by rear-struts to the rear of the canopy, and by forward-struts which extend from the front of a roof-canopy, over the cab, and down to left and right attachment points on the chassis of the vehicle.

However, providing such forward-struts, located in that manner, is contra-indicated in the case of a light commercial vehicle such as a pickup truck, from the standpoint that there is no convenient location, in such vehicles, at which such a forward-strut can be robustly attached to the chassis-girders, e.g in the area of the front bumper. In order to make provision for such forward-struts, it would be necessary e.g to weld brackets, or to drill bolt-holes, or the like, in/on the chassis-girders. Such things can hardly be done without compromising the structural integrity of the chassis (which would likely negate the truck insurance).

In the present technology, the disadvantages of providing forward-struts being noted, it is recognized that an adequately strong and rigid protective roof-canopy, over the roof of the cab, can be furnished even though the framework for supporting the canopy is attached to the chassis-girders—not at the front through forward-struts, but—through the floor of the cargo-box.

It is generally found that installing an internal rollcage, inside the cab, is not a good solution. An internal rollcage interferes significantly with access to the cab, and operation of the truck, and the rollcage itself is compromised by the need to minimize that inconvenience. Also, installation of an internal rollcage in a cab is expensive, and requires the services of specialized trained mechanics. Furthermore, internal rollcages in the cabs of pickup trucks, despite the expense and inconvenience, have not been shown to effectively prevent crushing damage to the cab.

External rollcages that attach to the chassis underneath the cab, are even more disruptive and expensive, but can be reasonably effective.

The present technology is aimed at providing a rollover protection structure that is robust enough, and is secured to the chassis robustly enough, to protect the cab from sustaining injury-causing damage during a rollover. At the same time, the aim is that the ROPS should not interfere with the main function of a pick-up truck, which is to enable persons to load items into, and unload items from, the cargo-box of the truck, and to transport those items by road over rough tracks, and should not interfere with access to the cab, and with normal driving and operation of the truck.

LIST OF DRAWINGS

FIG. 3 is a view of the ROPS of FIG. 1, on its own, from the back of the truck.

FIG. 4 is a view of the ROPS of FIG. 1, on its own, from the front of the truck.

FIG. 5 is a side-view of the ROPS of FIG. 1.

FIG. 6 is a top plan view of an integrated assembly of the ROPS of FIG. 1.

FIG. 7 is a close-up cross-section of a bolted joint, by which the ROPS is fixed to the truck.

Figure 1:
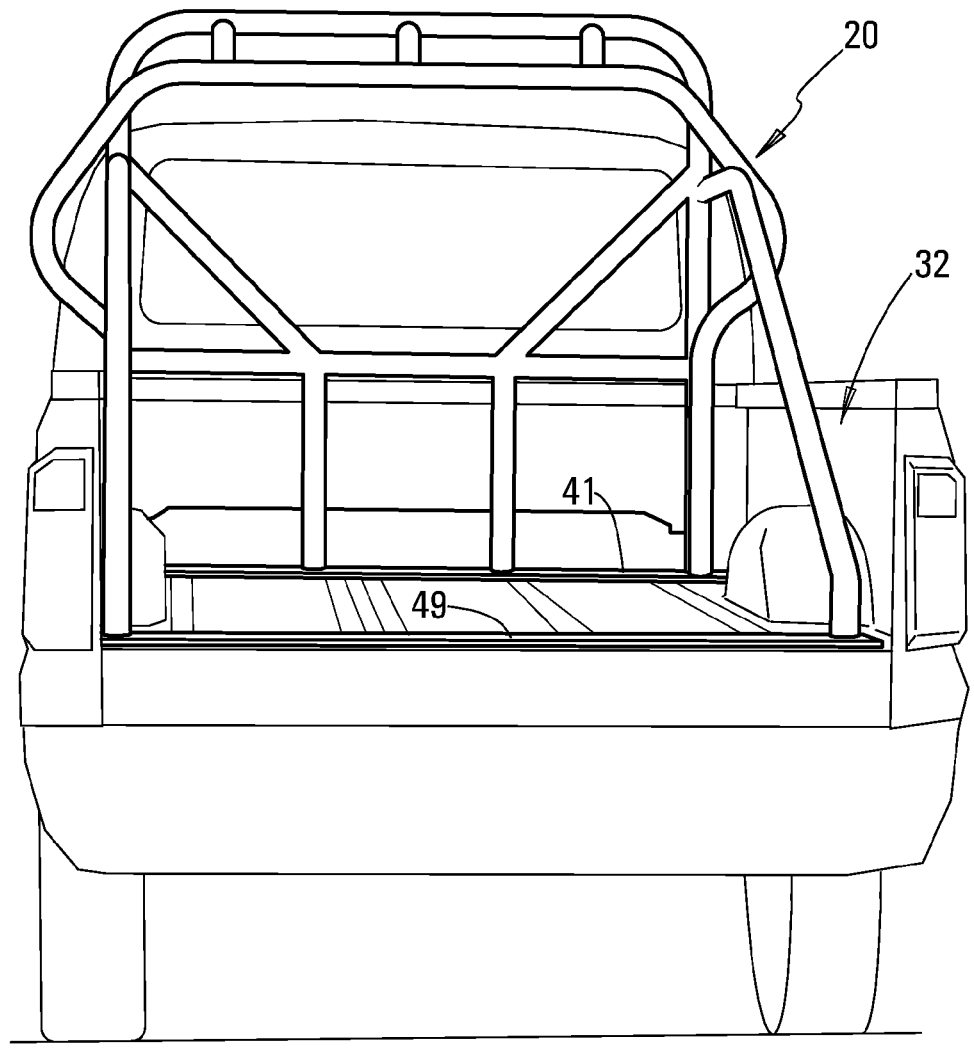
FIG. 1 is a pictorial view of the back of a pickup truck, in which has been installed a rollover protection structure (ROPS) that accords with the present technology.
Figure 2:
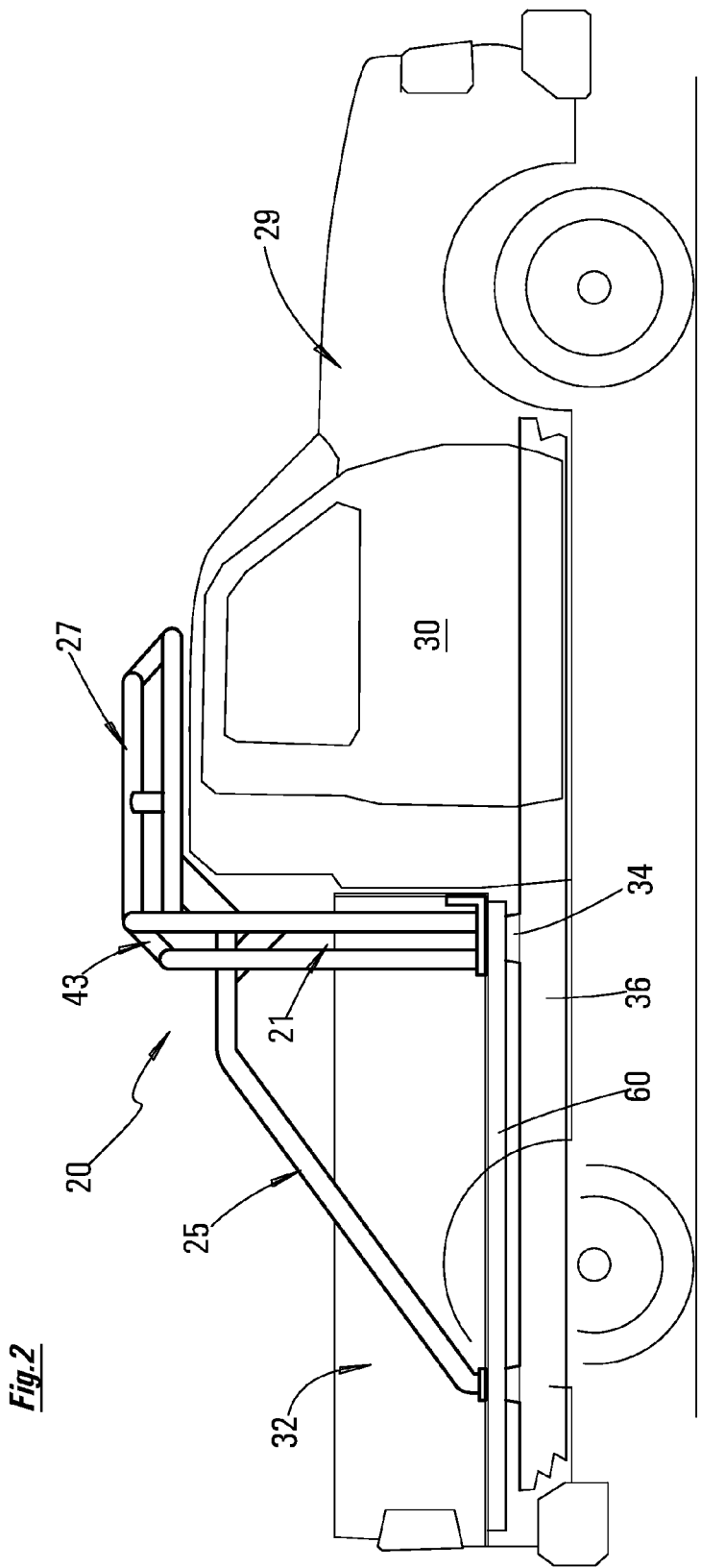
FIG. 2 is a diagrammatic side elevation of the truck and ROPS of FIG. 1.

The ROPS 20 of FIGS. 1-6 comprises a behind-cab-frame 21, a brace-frame 25, and a roof-canopy 27. The pickup truck 29 includes a cab 30 and a cargo-box 32, both of which are bolted to respective chassis-posts (the chassis-posts to which the cargo-box is bolted are shown at 34 in FIG. 2) the chassis-posts being integrated into the chassis-girders 36 of the truck.

The behind-cab-frame 21 comprises two steel tubes, each bent basically into an inverted U-shape. The front one 38 of these two tubes is a little taller than the rear tube 40. Both of the tubes 38,40 are welded at the bottom to a front-mounting-plate 41. The two tubes 38,40 of the behind-cab-frame 21 have the form of two left and two right pillars of great sturdiness, which support a cross-bar or bridge 43 at their top-ends.

The behind-cab-frame 21 thus serves as an immensely strong and rigid supporting structure for the bridge 43. Even when the truck is undergoing a violent rollover, the bridge 43 of the behind-cab-frame 21 is most unlikely to be able to move closer to the front-mounting-plate 41.

Extending forwards from the bridge 43 of the behind-cab-frame 21 is the roof-canopy 27. This is made from two steel canopy-tubes, bent to upper and lower U-shapes 45,47. Spacers 49 are welded in, to maintain the positions of the tubes 45,47 with respect to each other. As will be understood, the roof-canopy 27 is not only highly rigid in itself, but the joint at the top-end bridge 43 between the behind-cab-frame and the roof-canopy is also highly rigid. Left and right gussets 52 reinforce the rigidity of the joint area.

Thus, the roof-canopy 27 is highly resistant to being deflected relative to the behind-cab-frame 21 (and thus is highly likely to protect the roof of the cab from being crushed) even when the truck is undergoing violent rollover.

The behind-cab-frame 21 is braced into its desired upright position by the brace-frame 25. The brace-frame 25 includes left and right brace-struts 50, which are secured to a rear-mounting-plate 49. The rear-mounting plate 49 is—like the front-mounting-plate 41—bolted, through the box-floor, to chassis-posts 34.

It is recognized that the integrated-assembly 53 of the behind-cab-frame 21, the roof-canopy 27, and the front-mounting-plate 41, can be the same for many trucks. A number of pickup trucks vary very little as to the width of the floor of the cargo-box 32, and the one welded assembly can be used for all those trucks. In fact, most pickup trucks can be catered for with just two integrated-assemblies, one with a longer canopy to cater for the crew-cab option.

Figure 8:
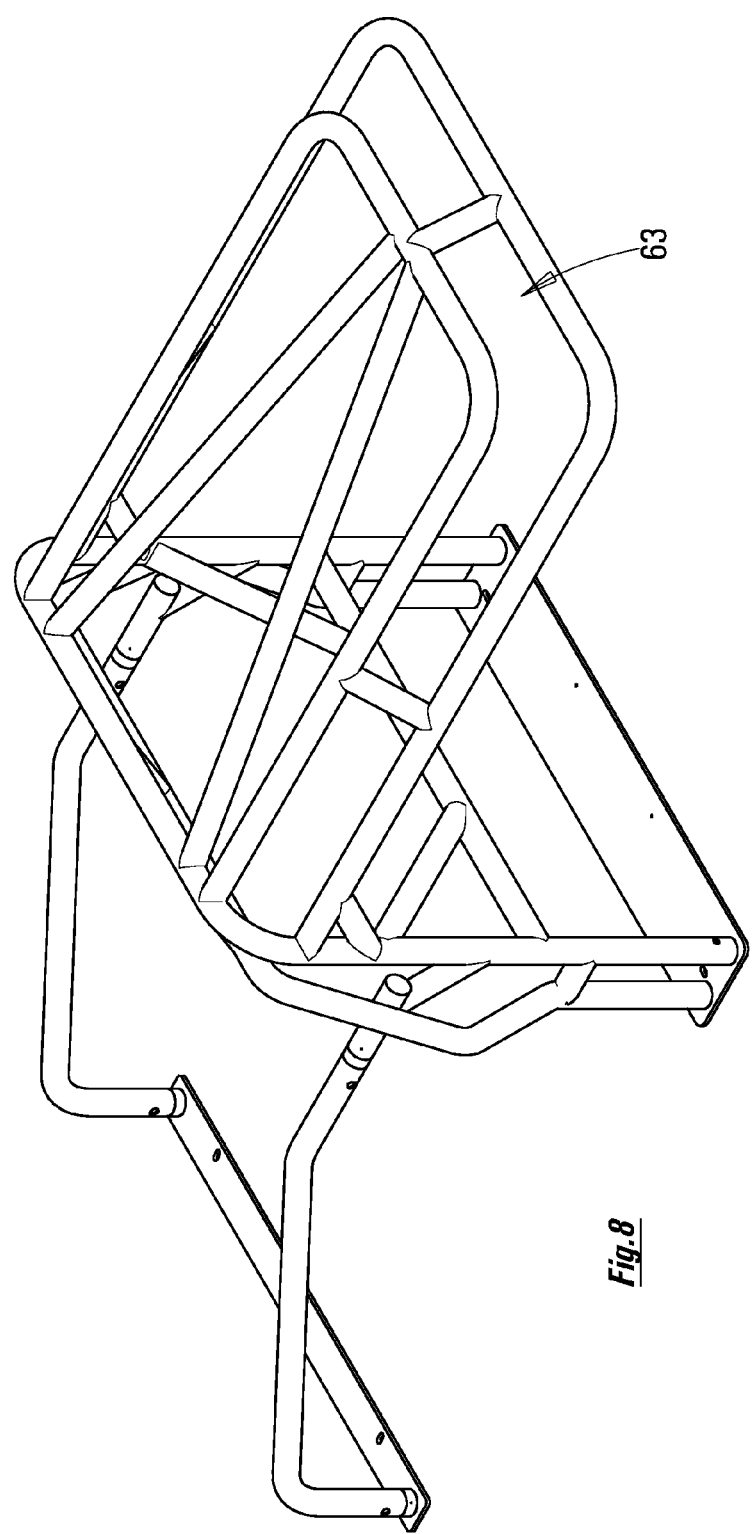
FIG. 8 is a pictorial view of another ROPS.

FIG. 8 shows a ROPS with a long roof-canopy 63. The ROPS of FIG. 8 also is suitable for a truck that has a longer cargo-box—and such a truck would likely also have a longer wheelbase.

The positions of the bolts-holes in the box-floor are more variable, but these variations can easily be accommodated by simply providing the mounting-plates with a selection of mounting holes, again without variation to the integrated-assembly 53.

However, the distance between the front of the cargo-box and the wheel-arch in the box-floor varies considerably, as between makes, models, options, and this variation affects the distance apart at which the front- and rear-mounting-plates 41,49 are located. For this reason, it is preferred to keep the components that make up the brace-frame 25 detachable and separable from the integrated-assembly 53. Thus, the ROPS for regular-cab trucks can be sold all with the same integrated assembly, and the only special component is the brace-frame 25, which is tailored to the individual length of the cargo-box in the particular truck.

The special brace-struts 50 for the particular truck engage studs 54 that are built into the behind-cab-frame, and are locked in place with cotter-pins 55. Conveniently, the two brace-struts 50 and the rear-mounting-plate 49 are mutually separable, again using cotter-pins to lock the tubes to studs that are fast to the rear-mounting-plate.

The major function of the brace-frame 25 is to hold the behind-cab-frame upright. If the brace-frame 25 were omitted, the behind-cab-frame 21 and the roof-canopy 27 could continue to provide all the required rollover protection for the cab 30—provided the behind-cab-frame remained upright. However, simply bolting the front-mounting-plate 41 (through the floor of the cargo-box) to the chassis would not keep the behind-cab-frame upright, i.e would not secure the behind-cab-frame against rocking or tipping in the pitch-mode.

The behind-cab-frame 21 is a highly robust structure, in itself. When the front-mounting-plate 41 of the behind-cab-frame is bolted to the chassis, the behind-cab-frame is locked very rigidly against all modes of movement relative to the chassis, other than pitch-mode tipping or rocking. Thus, it may be regarded that the major function of the brace-frame 25 is to prevent the behind-cab-frame 21 from rocking about the front-mounting-plate 41, in the pitch-mode.

Again, the ROPS is highly robust in itself; the ROPS does not gain its robustness from its interaction with the truck chassis. The exception to this is that the resistance of the behind-cab-frame to pitch-mode rocking indeed is derived from the interaction of the ROPS with the chassis—in that the brace-frame 25 enables the chassis to form a link that triangulates the behind-cab-frame, and thereby locks the behind-cab-frame against pitch-mode rocking.

During rollover, the forces on the ROPS 20 are not limited to simple compression of the behind-cab-frame 21, but rather the ROPS is subjected to heavy forces and impacts from all directions. It will be understood that the key to protecting the roof of the cab 30 lies in locking the bridge 43 of the behind-cab-frame to the chassis, not just robustly and rigidly, but substantially immovably, in the face of these impacts and forces. It will be understood, also, that the ROPS as described herein is a structure that is indeed highly effective in holding the bridge 43 in a fixed position relative to the chassis.

The brace-frame 25 enables a triangulation that braces the behind-cab-frame against pitch-mode-tipping. The brace-struts do not themselves need to be of immense construction. It is the behind-cab-frame that should be very strong, since that is what saves the cab from being flattened. But the immense rigidity of the behind-cab-frame 21 would count for nothing if the behind-cab-frame were not braced against pitch-mode tipping, relative to the chassis.

It will be understood that the ROPS as depicted and described herein achieves its advantageous safety function without in any way compromising the structural integrity of the chassis. Installation is easy and quick, and the installers do not need special training. Also advantageously, the ROPS for many makes and models of trucks can use the same behind-cab-frame/canopy/front-plate integrated-assembly 53. Also advantageously, as can be seen from FIG. 1, the ROPS hardly interferes with the use of the cargo-box for its intended purposes; and the ROPS does not interfere at all with access to the cab and normal operation of the truck. To be sure, the ROPS adds some weight to the truck (and its strength is related to its weight), but any ROPS faces that penalty. An external ROPS has a chunky visual appearance, but cosmetic considerations generally have little effect on commercial users of pickup trucks. One side-benefit of providing the ROPS in the cargo-box and over the cab-roof is that a convenient framework is provided on which may be mounted such accessories as a built-in secure toolbox, extra lighting fittings, and so on.

The ROPS depicted and described herein have mounting-plates by which the ROPS is secured to the chassis of the vehicle. As mentioned, one of the aims of the technology is to provide a ROPS that can be installed easily and quickly on an existing pickup truck, by unskilled persons, without disruption to the truck.

In order to assemble the ROPS, first the installers remove the box-bolts 56 (FIG. 7) that fasten the box-floor 58 of the cargo-box 32 to the chassis-posts 34 of the chassis-girders 36. These box-bolts 56 pass through bolt-holes in the sheet-metal of the box-floor 58, and then through corresponding bolt-holes in the box-floor-struts 60 that are part of the cargo-box 32. The box-bolts 56 continue on down, and are fastened through bolt-holes provided for the purpose in the chassis-posts 34. The chassis-posts 34 are welded or otherwise integrated into the chassis-girders 36 of the truck, and they provide a convenient and secure attachment location that enables the cargo-box to be firmly attached to the chassis. (In some trucks, there are no chassis-posts and the box-bolts are bolted directly into the chassis-girders.)

The box-attachment arrangements vary, truck to truck; a ROPS in accordance with the present technology can be regarded as suitable when the cargo-box is bolted down to the chassis, and when the box-bolts can be removed and replaced without affecting the structural integrity of the chassis. (The technology is not suitable for use on trucks in which the cargo-box is not fixed but is able to tip.)

An aim of the present technology is to make it possible basically to simply bolt the ROPS to the chassis, using the same box-bolts, and the same bolts-holes, that were already provided by the truck manufacturer for the purpose of attaching the cargo-box to the chassis. (The box-bolts that are required for attaching the ROPS might need to be slightly longer than the OEM box-bolts that came with the truck, but that is easily dealt with.)

If a particular pickup truck is of such construction that the cargo-bed is not bolted to the chassis, or if the box-bolts cannot be removed and replaced without disrupting the chassis, the present technology likely would not be applicable. Some previous ROPS have required that the truck be substantially dismantled, in order to provide anchorage for the ROPS. If the users are willing to resort to taking the truck to pieces, and to resort to substantially modifying the chassis and/or the cab, then no doubt they can provide an effective ROPS. But the present technology recognizes that a highly-effective ROPS can be provided, which only requires to be simply bolted through the box-floor of the cargo-box to the chassis in the same manner in which the cargo-box is already secured to the chassis—and recognizes that, apart from that rather trivial operation, no disruption to the structure of the truck is required.

The box-bolts 56 having been removed, the integrated-assembly of the behind-cab-frame 21, the roof-canopy 27, and the front-mounting-plate 41, can be hoisted into position. The bolt-holes in the front-mounting-plate 41 are aligned with the bolt-holes in the box-floor 58 and the chassis-posts 34. The brace-struts 50 are engaged with the studs 54 and locked in place with the cotter-pins 55. The brace-struts are also assembled to the rear-mounting-plate 49 in similar manner. The rear-mounting-plate 49 is bolted through the box-floor 58 and made fast to the chassis as was the case with the front-mounting-plate 41.

It may be noted that the forces acting on the box-bolts that secure the rear-mounting-plate 49 are likely to be considerably smaller than the forces on the box-bolts securing the front-mounting-plate (which bear the brunt of the impact forces). Thus, in some cases, it might be adequately sound, structurally, for the rear-mounting-plate 49 to be secured (e.g bolted) e.g to the box-floor-struts 60 of the cargo-box, rather than directly to the chassis-posts 34 or chassis-girders 36. (The box-floor-struts 60 would themselves be firmly secured to the chassis). Thus, the range of trucks to which the present technology can be applied need not be limited only to those trucks in which existing box-bolts and bolt-holes are accessible for use with the rear-mounting-plate 49.

Figures 9A, 9B:
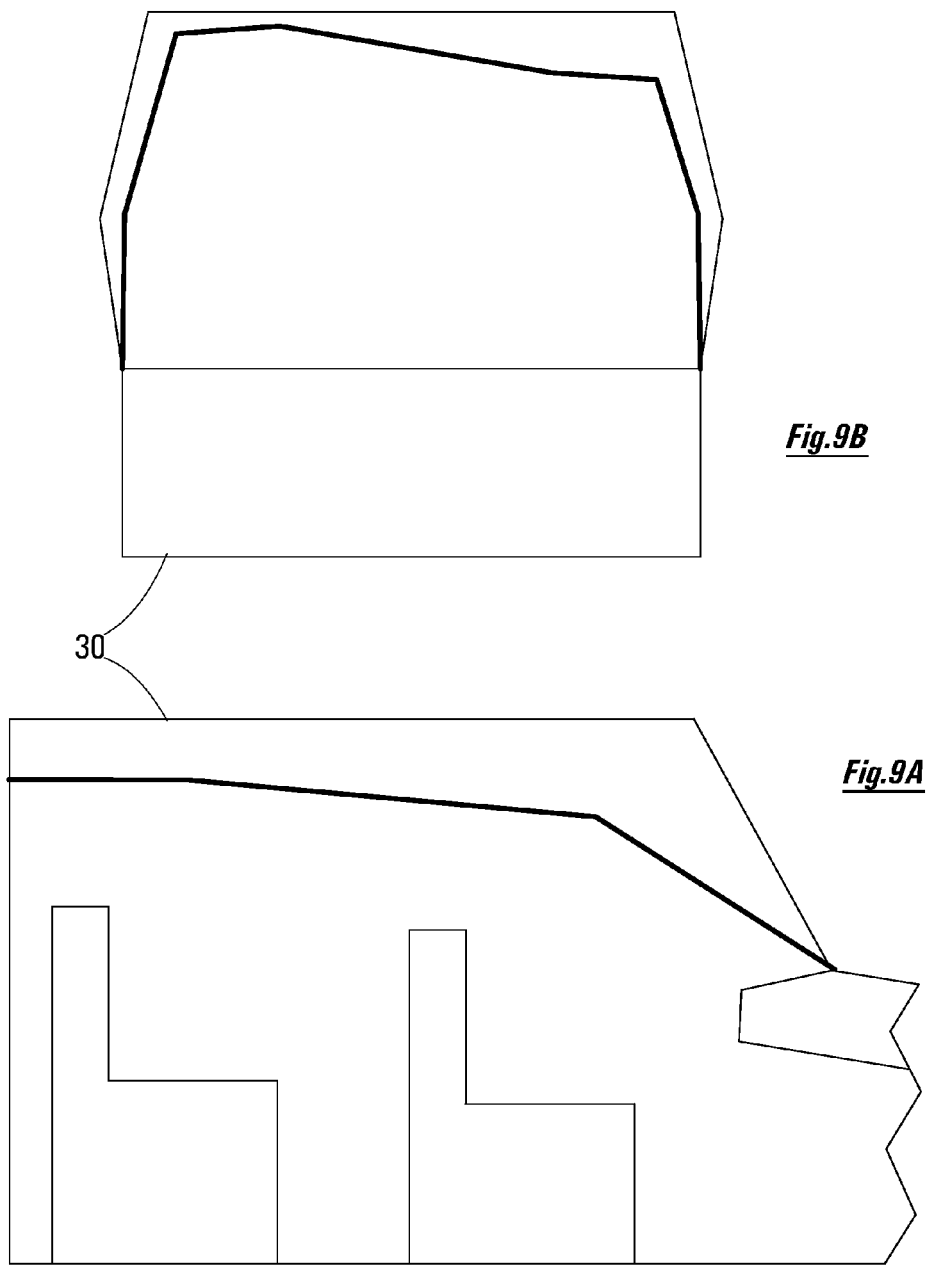
FIGS. 9A,9B are diagrammatic side and front cross-sectional views of the cab of a pickup truck having an internal ROPS, showing the condition of the cab before and after a rollover event.

FIGS. 9A,9B are diagrams that illustrate the results of two rollover tests performed on similar pickup trucks. In the first rollover test, the truck was fitted with an internal rollover protection structure, comprising a cage made of welded steel tubes, located inside the cab. When the ROPS is internal, compromises have to be made that affect the efficacy of the ROPS, in that the ROPS must be so configured as not to interfere with movement of persons into and out of the cab, nor with normal operations of the truck.

Certain dimensions in the cab were measured before and after the rollover event. The table shows the recorded measurements:

|  | before roll | after roll | percent crush |
|---|---|---|---|
| front seat headroom | 41.0 | 30.8 | 25.0 |
| front seat shoulder room | 65.3 | 61.0 | 6.5 |
| front seat hip room | 61.5 | 61.5 | 0 |
| left rear seat headroom | 38.5 | 36.5 | 5.2 |
| right rear seat headroom | 38.5 | 31.5 | 18.2 |
| rear seat shoulder room | 66.3 | 61.0 | 8.0 |
| rear seat hip room | 61.5 | 60.0 | 2.4 |
| front seat to windshield | 41.0 | 27.5 | 32.7 |

In FIG. 9A, the plain lines show the internal form of the sides and roof of the cab in end-elevation, prior to the rollover test, from the above "before" dimensions. FIG. 9B shows the same thing in side-elevation.

The bold lines in the two drawings show the condition of the cab, following the first test, using the internal ROPS, from the above "after" dimensions.

Of course, the "after" dimensions of the cab were measured after the truck came to rest. Thus, the measured "after" dimensions represent permanent or set distortions, that are retained after the structure has come to rest. One may be sure that the magnitude of the distortions was even greater, actually during the rollover event. It will be understood from the table that significant crushing of the cab occurred as a result of the rollover—despite the presence inside the cab of the internal ROPS.

In the second test, a similar truck was fitted with an external ROPS in accordance with the present technology. It happened that, in the second test, one of the box-bolts holding the front-mounting-plate to the chassis-girders was torn out. This was probably due to the corroded state of the chassis-post on the chassis-girder to which the box-bolt was fastened. Despite this, a video of the test shows that the roof-canopy of the ROPS was in place, overlying and protecting the cab-roof, when the still-rolling truck was upside down.

Following the second test, it was found that the internal dimensions of the roof and sides of the cab, as illustrated again by the plain lines in FIGS. 9A,B, had not changed. That is to say, when the cab was protected by the external ROPS, as described herein, the roof and sides of the cab were not compressed to any measurable degree. (Thus, no diagrams showing the second test are included—or, in other words, the plain lines in FIGS. 9A,9B represent the second test cab both "before" and "after" the rollover test.)

Thus, in the first test, the occupants could hardly expect to escape serious crushing injuries; in the second test (assuming their seat-belts and airbags deployed properly) the occupants could expect to walk away injury-free. It is mentioned again that, in the second test, one of the front-mounting-plate box-bolts tore away of the chassis, and yet still the external ROPS provided full protection for the cab.

It is not suggested that the present ROPS should be used without being bolted firmly to the truck chassis. But the fact remains that one of the box-bolts tore free during the second test. This might well have been regarded—if the second test had resulted in a badly-crushed cab—as a good reason to discount the second test, in that a truck with such a badly corroded chassis would not be on the road. But what actually occurred in the second test was that the external ROPS, as described herein, still did provide excellent (potentially life-saving) protection for the cab-roof.

As shown in FIGS. 1,3,4, the rear-pillar tube 40 of the behind-cab-frame 21 has been formed with protruding side-ears 61. These ears can be effective to prevent impacts from reaching the sides of the cab 30. As will be understood, this extra side-protection can be procured more or less for nothing in the external ROPS as described.

The described technology is highly suitable for the after-market, i.e for use when the ROPS is to be retro-fitted to an already manufactured truck. The technology might be less advantageous when integrating a ROPS into a truck as a feature of the original design and manufacture of the truck.

The scope of the patent protection sought herein is defined by the accompanying claims. The apparatuses and procedures shown in the accompanying drawings and described herein are examples.

A reference to a component being "integrated rigidly into" another component means, herein, that the two components are either formed from one common piece of material, or, if formed separately, are fixed together so firmly and rigidly as to be functionally and operationally equivalent to having been formed from one common piece of material.

The numerals used in the drawings are listed as:
20 rollover protection structure (ROPS)
21 behind-cab-frame
25 brace-frame
27 roof-canopy
29 pickup truck
30 cab of truck
32 cargo-box of truck
34 chassis-post
36 chassis-girder
38 front pillar-tube of behind-cab-frame
40 rear pillar-tube of behind-cab-frame
41 front-mounting-plate
43 cross-bar or bridge of behind-cab-frame
45 upper tube of roof-canopy
47 lower tube of roof-canopy
49 rear-mounting-plate
50 brace-struts
52 gussets
53 integrated assembly (21+27+41)
54 studs for brace-struts
55 cotter pins
56 box-bolts
58 box-floor
60 box-floor-struts
61 side-ears of 40
63 roof-canopy (FIG. 8).

The invention claimed is:

1. A procedure for mounting an external rollover protection structure (ROPS) onto a truck, including:
providing a truck having a cab, a cargo-box behind the cab, and a chassis;
the chassis being formed with mounting-structures, to which fasteners can be attached;
the mounting-structures in the chassis are located close behind the cab;
providing a ROPS, the ROPS having an integrated-assembly comprising a front-mounting-plate, a behind-cab-frame, and a roof-canopy, integrated rigidly together;
providing fasteners, and engaging the fasteners with the front-mounting-plate and with the mounting-structures in the chassis;
whereby the fasteners, thus engaged, make the front-mounting-plate fast to the mounting-structures in the chassis.

2. The procedure as in claim 1, including:
where the cargo-box has a box-floor, having front-floor-bolt-holes;
where the chassis of the truck includes left and right chassis-girders;
where the mounting-structures in the chassis include front-bolt-receiving-sockets which are integrated into or onto the chassis-girders;
where the front-mounting-plate is formed with front-plate-bolt-holes;
exposing the front-floor-bolt-holes and the front-bolt-receiving-sockets;
placing the integrated-assembly into the cargo-box;
so positioning the integrated-assembly that the behind-cab-frame lies close behind the cab and the roof-canopy overlies the roof of the cab;
so positioning the front-mounting-plate of the integrated-assembly on the box-floor that the front-plate-bolt-holes align with the front-floor-bolt-holes;
passing front-box-bolts through the front-plate-bolt-holes and the front-floor-bolt-holes;
tightening the front-box-bolts into the front-bolt-receiving-sockets;
thereby making the integrated-assembly fast to the chassis of the truck.

3. The procedure as in claim 2, including:
where the behind-cab-frame of the integrated-assembly comprises left and right pillars, which support a bridge of the behind-cab-frame;
where the roof-canopy is integrated rigidly into the behind-cab-frame, at the bridge;
where the behind-cab-frame includes brace-receivers, located on the left and right pillars at or near the bridge;
providing a brace-frame, which includes a rear-mounting-plate;
attaching the brace-frame to the brace-receivers;
making the rear-mounting-plate fast to the chassis of the truck;
whereby the brace-frame braces the behind-cab-frame in an upright position, with the roof-canopy overlying the cab.

4. The procedure as in claim 3, wherein:
where the box-floor has rear-floor-bolt-holes;
where the mounting-structures in the chassis include rear-bolt-receiving-sockets which are integrated into or onto the chassis-girders;
where the rear-mounting-plate is formed with rear-plate-bolt-holes;
exposing the rear-floor-bolt-holes and the rear-bolt-receiving-sockets;
so positioning the rear-mounting-plate of the brace-frame on the box-floor that the rear-plate-bolt-holes align with the rear-floor-bolt-holes;
passing rear-box-bolts through the rear-plate-bolt-holes and the rear-floor-bolt-holes;
tightening the rear-box-bolts into the rear-bolt-receiving-sockets;
thereby making the brace-frame fast to the chassis of the truck.

5. The procedure as in claim 2, including exposing the front-floor-bolt-holes and the front-bolt-receiving-sockets by:
loosening existing front-box-bolts that secure the cargo-box to the chassis from the bolt-receiving-sockets; and
removing the box-bolts through the floor-bolt-holes.

6. The procedure as in claim 1, wherein:
the truck has box-fasteners by which the cargo-box is fastened to the mounting-structures of the chassis;
the procedure includes removing the box-fasteners, prior to engaging the fasteners with the front-mounting-plate and with the mounting-structures in the chassis.

7. The procedure as in claim 1, wherein:
where the cargo-box has a box-floor, having front-floor-fastener-holes;
where the mounting-structures in the chassis include front-fastener-receivers;
where the front-mounting-plate is formed with front-plate-fastener-holes;
and the procedure includes exposing the front-floor-fastener-holes and the front-fastener-receivers, prior to engaging the fasteners with the front-mounting-plate and with the mounting-structures in the chassis.

8. A rollover protection structure (ROPS) for a vehicle, wherein:
the ROPS has the capability, as a physical structure, to be incorporated into a vehicle, being a vehicle that has the following characteristics:

(a) the vehicle has left and right chassis-girders having front-bolt-receiving-sockets, and a cab;
(b) the vehicle includes a cargo-box, having a box-floor of sheet metal;
(c) the cargo-box is provided with front-floor-bolt-holes in the sheet-metal box-floor;
the ROPS includes a behind-cab-frame, a front-mounting-plate, and a roof-canopy;
the roof-canopy extends forwards from the top-end of the behind-cab-frame;
the behind-cab-frame, the front-mounting-plate, and the roof-canopy, together form an integrated-assembly, in that the behind-cab-frame, the front-mounting-plate, and the roof-canopy, are integrated solidly and rigidly together in such manner as to preclude relative movement therebetween;
the front-mounting-plate is so configured that, when the integrated-assembly is placed in the cargo-box, the front-mounting-plate:
(a) can lie flat against the box-floor; and
(b) can be so positioned that front-plate-bolt-holes in the front-mounting-plate align with the front-floor-bolt-holes in the box-floor;
thereby enabling:
(a) front-box-bolts to pass through both the front-plate-bolt-holes and the front-floor-bolt-holes;
(b) the front-box-bolts to be tightened into the front-bolt-receiving-sockets; and
(c) securement of the integrated-assembly to the chassis.

9. The rollover protection structure as in claim 8, wherein:
the behind-cab-frame of the integrated-assembly comprises left and right pillars, which support a bridge of the behind-cab-frame;
the roof-canopy is integrated rigidly into the behind-cab-frame, at the bridge;
the behind-cab-frame includes brace-receivers, located on the left and right pillars at or near the bridge;
the ROPS includes a brace-frame, which includes a rear-mounting-plate;
the brace-frame is attached to the brace-receivers;
the rear-mounting-plate is fast to the chassis;
whereby the brace-frame braces the behind-cab-frame in an upright position, with the roof-canopy overlying the cab.

10. The rollover protection structure as in claim 9, wherein:
the behind-cab-frame and the roof-canopy of the integrated-assembly are formed of steel tubes, welded together; and
the front-mounting-plate includes a flat-plate, which is welded to the steel tubes.

11. The rollover protection structure as in claim 10, wherein:
the brace-receivers comprise a stud and socket engagement between the behind-cab-frame and the brace-frame;
the brace-receivers are located at or near the bridge of the behind-cab-frame;
the rear-mounting-plate being made fast to the chassis, the brace-frame has the capability, as a physical structure to brace the behind-cab-frame against tipping or rocking movement of the behind-cab-frame in a roll-mode about the front-mounting-plate.

12. A combination of a rollover protection structure (ROPS) and a pickup-truck, wherein:
the truck has left and right chassis-girders having front-bolt-receiving-sockets;
the truck includes a cargo-box, having a box-floor of sheet metal;
the cargo-box is provided with front-floor-bolt-holes in the sheet-metal box-floor;
the ROPS includes a behind-cab-frame, a front-mounting-plate, and a roof-canopy;
the roof-canopy extends forwards from the top-end of the behind-cab-frame, over the roof of the cab of the truck;
the behind-cab-frame, the front-mounting-plate, and the roof-canopy, together form an integrated-assembly, in that the behind-cab-frame, the front-mounting-plate, and the roof-canopy, are integrated solidly and rigidly together in such manner as to preclude relative movement therebetween;
the integrated-assembly being placed in the cargo-box of the truck, with the front-mounting-plate lying flat against the box-floor of the truck, the front-plate-bolt-holes align with the front-floor-bolt-holes in the box-floor;
front-box-bolts pass through both the front-plate-bolt-holes and the front-floor-bolt-holes;
the front-box-bolts are tightened into the front-bolt-receiving-sockets, thereby securing the integrated-assembly to the chassis.

13. The combination as in claim 12, wherein:
the roof-canopy of the ROPS has no direct attachment to the roof of the cab;
the roof-canopy is not made fast, directly or indirectly, to any part of the chassis of the truck, except that the roof-canopy is a component of the integrated assembly, and the front-mounting-plate of the integrated-assembly is made fast to the chassis of the truck.

\* \* \* \* \*